(12) United States Patent
Alasti et al.

(10) Patent No.: US 12,382,363 B2
(45) Date of Patent: Aug. 5, 2025

(54) ATSSS MULTIPLE 3GPP ACCESS FOR ENHANCED PERFORMANCE

(71) Applicant: DISH Wireless L.L.C., Englewood, CO (US)

(72) Inventors: Mehdi Alasti, Arlington, VA (US);
Jingyi Zhou, Belle Mead, NJ (US);
Venkatesh Bommasandra Sadasiva, Littleton, CO (US); Siddhartha Chenumolu, Broadlands, VA (US)

(73) Assignee: DISH WIRELESS L.L.C., Englewood, CO (US)

( * ) Notice: Subject to any disclaimer, the term of this patent is extended or adjusted under 35 U.S.C. 154(b) by 427 days.

(21) Appl. No.: 17/887,210

(22) Filed: Aug. 12, 2022

(65) Prior Publication Data

US 2024/0056938 A1 Feb. 15, 2024

(51) Int. Cl.
*H04W 40/12* (2009.01)
*H04L 45/16* (2022.01)
*H04L 45/24* (2022.01)

(52) U.S. Cl.
CPC ............ *H04W 40/12* (2013.01); *H04L 45/16* (2013.01); *H04L 45/24* (2013.01)

(58) Field of Classification Search
None
See application file for complete search history.

(56) References Cited

U.S. PATENT DOCUMENTS

| | | | | |
|---|---|---|---|---|
| 2015/0103769 | A1* | 4/2015 | Kaichis | H04W 16/04 370/329 |
| 2018/0041914 | A1* | 2/2018 | Zhang | H04W 28/10 |
| 2019/0306068 | A1* | 10/2019 | Kiss | H04W 80/06 |
| 2021/0258817 | A1* | 8/2021 | Kolding | H04L 45/24 |

(Continued)

FOREIGN PATENT DOCUMENTS

WO 2022/050659 A1 3/2022

OTHER PUBLICATIONS

Huawei, HiSilicon, Lenovo, Motorola Mobility, "Clarification on threshold values," S2-2109096 (revision of S2-2108730), 3GPP TSG-WG SA2 Meeting #148E e-meeting, Elbonia, Nov. 11-15, 2021. (4 pages).

(Continued)

*Primary Examiner* — Lonnie V Sweet
(74) *Attorney, Agent, or Firm* — Seed IP Law Group LLP

(57) ABSTRACT

Disclosed is a method performed by a UE device that routes traffic to a 5G Core Network. The method includes receiving a first ATSSS rule including first traffic descriptor information and first steering mode information that identifies a first 3GPP access network operated by a first MNO, and a second ATSSS rule including second traffic descriptor information and second steering mode information that identifies a second 3GPP access network operated by the first MNO or a second MNO; transmitting a first type of traffic corresponding to the first traffic descriptor information included in the first ATSSS rule to the first 3GPP access network operated by the first MNO; and transmitting the first type of (Continued)

traffic or a second type of traffic corresponding to the second traffic descriptor information included in the second ATSSS rule to the second 3GPP access network operated by the first MNO or the second MNO.

20 Claims, 9 Drawing Sheets

(56) References Cited

U.S. PATENT DOCUMENTS

| | | | |
|---|---|---|---|
| 2021/0258868 A1 | 8/2021 | Wong et al. | |
| 2022/0110177 A1 | 4/2022 | Choksi et al. | |
| 2022/0116327 A1* | 4/2022 | Salkintzis | H04W 28/0215 |
| 2022/0116822 A1* | 4/2022 | Sahin | H04L 67/56 |
| 2022/0247869 A1* | 8/2022 | Johnson | H04M 15/72 |
| 2023/0132058 A1* | 4/2023 | Youn | H04L 12/14 370/329 |
| 2023/0180057 A1 | 6/2023 | Tonesi et al. | |
| 2023/0319634 A1* | 10/2023 | Youn | H04W 80/10 370/229 |
| 2023/0413114 A1* | 12/2023 | Ly | H04W 28/0215 |
| 2024/0015562 A1* | 1/2024 | Youn | H04W 24/10 |
| 2024/0015590 A1* | 1/2024 | Shekhar | H04W 76/15 |
| 2024/0259857 A1* | 8/2024 | Zhu | H04W 28/0263 |
| 2024/0381235 A1* | 11/2024 | Li | H04W 48/18 |

OTHER PUBLICATIONS

Huawei, HiSilicon, "KI #2, Sol #7: Update MP-QUIC solution to solve ENs," S2-200686 (revision of S2-2005474), 3GPP TSG-WG SA2 Meeting #140E e-meeting, Agenda Item: 8.6, Elbonia, Aug. 19-Sep. 1, 2020. (6 pages).

International Search Report and Written Opinion, mailed Nov. 2, 2023, for International Application No. PCT/US2023/029777. (15 pages).

Qualcomm, "Upper Layer TRaffic Aggregation and Steering, over dual 3GPP access (ULTRAS)," S1-220112 (revision of S1-yyxxxx), 3GPP SA WG1 Meeting #97e, Electronic Meeting, Feb. 14-24, 2022. (14 pages).

International Search Report and Written Opinion, dated Nov. 13, 2023, for International Patent Application No. PCT/US2023/029776. (17 pages).

* cited by examiner

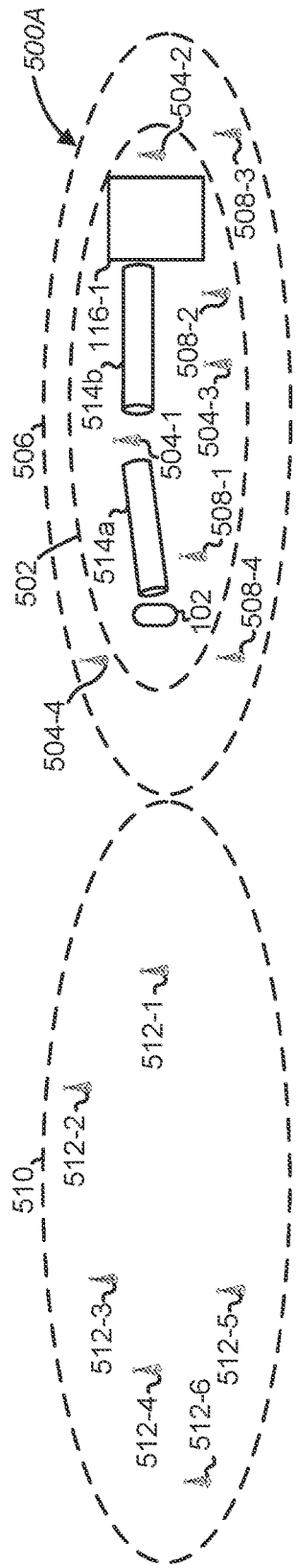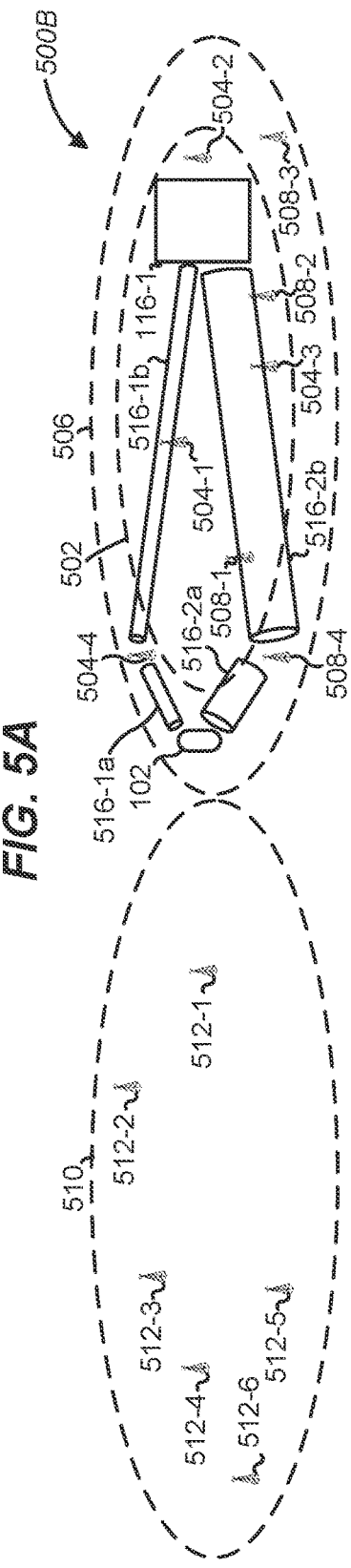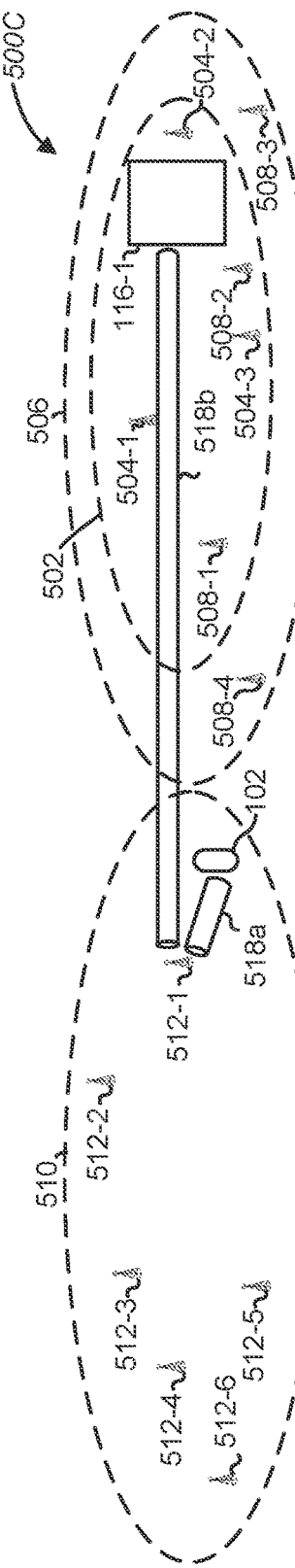

ATSSS MULTIPLE 3GPP ACCESS FOR ENHANCED PERFORMANCE

BACKGROUND

Access Traffic Steering, Switching & Splitting (ATSSS) is an optional feature included in Third Generation Partnership Project (3GPP) Fifth Generation (5G) New Radio (NR) Release 16, which can help to improve an end-user network experience. ATSSS can be used to select a best network, perform seamless handover, and perform network aggregation. ATSSS enables traffic steering across multiple accesses at a finer granularities than a Protocol Data Unit (PDU) session. ATSSS introduces the notion of a Multi Access PDU session, in which data traffic can be served over one or more concurrent accesses, including 3GPP access, trusted non-3GPP access, and untrusted non-3GPP access.

3GPP 5G NR Releases 16 and 17 only supports ATSSS across 3GPP and non-3GPP (trusted or untrusted) access networks. Future releases (e.g., 3GPP NR Release 18) may leverage ATSSS and Multi-Universal Mobile Telecommunications System (UMTS) Subscriber Identity Module (MUSIM) to enable ATSSS across two 3GPP access networks, which would enable a User Equipment (UE) device to have similar ATSSS capabilities across multiple 3GPP networks.

BRIEF SUMMARY

According to the present disclosure, a MUSIM-enabled User Equipment (UE) device can access two different 3GPP networks using ATSSS (e.g., 3GPP 5G NR Release 18 ATSSS) along with multi-path connections (e.g., Multipath Transmission Control Protocol (TCP) (MPTCP) or Multipath Quick User Datagram Protocol (UPD) Internet Connection (MPQUIC) protocol). A User Plane Function (UPF) performs Layer 4 (e.g., TCP) optimization, terminates TCP sockets on a side of the UPF that is adjacent to a Data Network (DN), and initiates a new multipath (MPTCP) Layer 4 link toward the UE device. By using ATSSS and a multi-path connection protocol (e.g., MPTCP or MPQUIC) according to the present disclosure, a subscriber can have enhanced network access, for example, that results in increased capacity, reduced latency, increased reliability, etc. In addition, using ATSSS and MPTCP according to the present disclosure, can result in enhanced cell edge performance and enhanced mobility.

For example, a subscriber to a first mobile network operator (e.g., DISH Network) using a MUSIM-enabled UE device an connect to both a fifth-generation (5G) Standalone (SA) network operated by the first mobile network operator, and a fifth-generation (5G) Non-Standalone (NSA) network operated by a roaming partner (e.g., AT&T) of the first mobile network operator, at the same time in a network coverage area including the first mobile network operator. By way of another example, a subscriber to a first mobile network operator (e.g., DISH Network) using a MUSIM-enabled UE device in roaming can connect to two networks operated by two roaming partners (e.g., AT&T and T-Mobile) of the first mobile network operator at the same time. By way of yet another example, a subscriber to a first mobile network operator (e.g., DISH Network) using a MUSIM-enabled UE device in roaming can select a best roaming partner network between two networks operated by two roaming partners (e.g., AT&T and T-Mobile) of the first mobile network operator.

A method of routing traffic between a fifth-generation (5G) New Radio (NR) cellular telecommunication radio access network (RAN) and a 5G Core Network according to the present disclosure may be characterized as including: storing, by a user equipment (UE) device, a plurality of Access Traffic Steering, Switching and Splitting (ATSSS) rules, including at least a first ATSSS rule and a second ATSSS rule, where the first ATSSS rule includes first traffic descriptor information corresponding to a first type of traffic and first steering mode information including a first network indicator corresponding to a first Third-Generation Partnership Project (3GPP) access network operated by a first Mobile Network Operator (MNO), and where the second ATSSS rule includes second traffic descriptor information corresponding to the first type of traffic or a second type of traffic and second steering mode information including a second network indicator corresponding to a second 3GPP access network operated by the first MNO or a second MNO; transmitting, by the UE device, the first type of traffic corresponding to the first traffic descriptor information included in the first ATSSS rule to the first 3GPP access network operated by the first MNO; and transmitting, by the UE device, the first type of traffic or the second type of traffic corresponding to the second traffic descriptor information included in the second ATSSS rule to the second 3GPP access network operated by the first MNO or the second MNO.

The transmitting the first type of traffic corresponding to the first traffic descriptor information included in the first ATSSS rule to the first 3GPP access network operated by the first MNO may be performed using a Multipoint Transmission Control Protocol (MPTCP), and the transmitting the first type of traffic or the second type of traffic corresponding to the second traffic descriptor information included in the second ATSSS rule to the second 3GPP access network operated by the first MNO or the second MNO may be performed using the MPTCP.

The transmitting the first type of traffic corresponding to the first traffic descriptor information included in the first ATSSS rule to the first 3GPP access network operated by the first MNO may be performed using a Multipath Quick User Datagram Protocol (UPD) Internet Connection (MPQUIC) protocol, and the transmitting the first type of traffic or the second type of traffic corresponding to the second traffic descriptor information included in the second ATSSS rule to the second 3GPP access network operated by the first MNO or the second MNO may be performed using the MPQUIC protocol.

The second steering mode information included in the second ATSSS rule may include the first network indicator corresponding to the first 3GPP access network operated by the first MNO and the second network indicator corresponding to the second 3GPP access network operated by the first MNO or the second MNO, and the method may further include, before or after the transmitting the first type of traffic or the second type of traffic corresponding to the second traffic descriptor information included in the second ATSSS rule to the second 3GPP access network operated by the first MNO or the second MNO, transmitting, by the UE device, the first type of traffic or the second type of traffic corresponding to the second traffic descriptor information included in the second ATSSS rule to the first 3GPP access network operated by the first MNO. The second steering mode information included in the second ATSSS rule may indicate that the first 3GPP access network operated by the first MNO is a standby network, and the second steering mode information included in the second ATSSS rule may indicate that the second 3GPP access network operated by the first MNO or the second MNO is an active network.

The ATSSS rules may include a third ATSSS rule, the third ATSSS rule may include third traffic descriptor information corresponding to a third type of traffic and steering mode information indicating smallest delay, and the method may further include: determining a first Round-Trip Time (RTT) corresponding to the first 3GPP access network operated by the first MNO, determining a second RTT corresponding to the second 3GPP access network operated by the first MNO or the second MNO, if the first RTT is greater than the second RTT, transmitting, by the UE device, the third type of traffic corresponding to the third traffic descriptor information included in the third ATSSS rule to the second 3GPP access network operated by the first MNO or the second MNO, and if the first RTT is less than the second RTT, transmitting, by the UE device, the third type of traffic corresponding to the third traffic descriptor information included in the third ATSSS rule to the first 3GPP access network operated by the first MNO.

The ATSSS rules may include a third ATSSS rule, the third ATSSS rule may include third traffic descriptor information corresponding to an application and steering mode information indicating a first percentage corresponding to the first 3GPP access network operated by the first MNO and a second percentage corresponding to the second 3GPP access network operated by the first MNO or the second MNO, and the method may further include: transmitting, by the UE device, first traffic corresponding to the application to the first 3GPP access network operated by the first MNO based on the first percentage corresponding to the first 3GPP access network operated by the first MNO, and transmitting, by the UE device, second traffic corresponding to the application to the second 3GPP access network operated by the first MNO or the second MNO based on the second percentage corresponding to the second 3GPP access network operated by the first MNO or the second MNO.

A method of routing traffic between a fifth-generation (5G) New Radio (NR) cellular telecommunication radio access network (RAN) and a 5G Core Network according to the present disclosure may be characterized as including: receiving, by a User Plane Function (UPF) device, a plurality of Access Traffic Steering, Switching and Splitting (ATSSS) rules, including at least a first ATSSS rule and a second ATSSS rule, where the first ATSSS rule includes first traffic descriptor information corresponding to a first type of traffic and first steering mode information including a first network indicator corresponding to a first Third-Generation Partnership Project (3GPP) access network operated by a first Mobile Network Operator (MNO), and where the second ATSSS rule includes second traffic descriptor information corresponding to the first type of traffic or a second type of traffic and second steering mode information including a second network indicator corresponding to a second 3GPP access network operated by the first MNO or a second MNO; transmitting, by the UPF device, the first type of traffic corresponding to the first traffic descriptor information included in the first ATSSS rule to a User Equipment (UE) device via the first 3GPP access network operated by the first MNO; and transmitting, by the UPF device, the first type of traffic or the second type of traffic corresponding to the second traffic descriptor information included in second ATSSS rule to the UE device via the second 3GPP access network operated by the first MNO or the second MNO.

The transmitting the first type of traffic corresponding to the first traffic descriptor information included in the first ATSSS rule to the UE device via the first 3GPP access network operated by the first MNO may be performed using a Multipoint Transmission Control Protocol (MPTCP), and the transmitting the first type of traffic or the second type of traffic corresponding to the second traffic descriptor information included in the second ATSSS rule to the UE device via the second 3GPP access network operated by the first MNO or the second MNO may be performed using the MPTCP.

The transmitting the first type of traffic corresponding to the first traffic descriptor information included in the first ATSSS rule to the first 3GPP access network operated by the first MNO may be performed using a Multipath Quick User Datagram Protocol (UPD) Internet Connection (MPQUIC) protocol, and the transmitting the first type of traffic or the second type of traffic corresponding to the second traffic descriptor information included in the second ATSSS rule to the second 3GPP access network operated by the first MNO or the second MNO may be performed using the MPQUIC protocol.

The second steering mode information included in the second ATSSS rule may include the first network indicator corresponding to the first 3GPP access network operated by the first MNO and the second network indicator corresponding to the second 3GPP access network operated by the first MNO or the second MNO, and the method may further include, before or after the transmitting the first type of traffic or the second type of traffic corresponding to the second traffic descriptor information included in the second ATSSS rule to the second 3GPP access network operated by the first MNO or the second MNO, transmitting, by the UPF device, the first type of traffic or the second type of traffic corresponding to the second traffic descriptor information included in the second ATSSS rule to the UE device via the first 3GPP access network operated by the first MNO. The second steering mode information included in the second ATSSS rule may indicate that the first 3GPP access network operated by the first MNO is a standby network, and the second steering mode information included in the second ATSSS rule may indicate that the second 3GPP access network operated by the first MNO or the second MNO is an active network.

The ATSSS rules may include a third ATSSS rule, the third ATSSS rule may include third traffic descriptor information corresponding to a third type of traffic and steering mode information indicating smallest delay, and the method may further include: determining a first Round-Trip Time (RTT) corresponding to the first 3GPP access network operated by the first MNO, determining a second RTT corresponding to the second 3GPP access network operated by the first MNO or the second MNO, if the first RTT is greater than the second RTT, transmitting, by the UPF device, the third type of traffic corresponding to the third traffic descriptor information included in the third ATSSS rule to the UE device via the second 3GPP access network operated by the first MNO or the second MNO, and if the first RTT is less than the second RTT, transmitting, by the UPF device, the third type of traffic corresponding to the third traffic descriptor information included in the third ATSSS rule to the UE device via the first 3GPP access network operated by the first MNO.

The ATSSS rules may include a third ATSSS rule, the third ATSSS rule may include a third traffic descriptor information corresponding to an application and steering mode information indicating a first percentage corresponding to the first 3GPP access network operated by the first MNO and a second percentage corresponding to the second 3GPP access network operated by the first MNO or the second MNO, and the method may further include: transmitting, by the UPF device, first traffic corresponding to the application to the UE device via the first 3GPP access network operated by the first MNO based on the first percentage corresponding to the first 3GPP access network operated by the first MNO, and transmitting, by the UPF device, second traffic corresponding to the application to the UE device via the second 3GPP access network operated by the first MNO or the second MNO based on the second percentage corresponding to the second 3GPP access network operated by the first MNO or the second MNO.

A User Equipment (UE) device that routes traffic between a fifth-generation (5G) New Radio (NR) cellular telecommunication radio access network (RAN) and a 5G Core Network according to the present disclosure may be characterized as including: at least one memory that stores computer executable instructions; and at least one processor that executes the computer executable instructions to cause actions to be performed, the actions including: receive a plurality of Access Traffic Steering, Switching and Splitting (ATSSS) rules, including at least a first ATSSS rule and a second ATSSS rule, where the first ATSSS rule includes first traffic descriptor information corresponding to a first type of traffic and first steering mode information including a first network indicator corresponding to a first Third-Generation Partnership Project (3GPP) access network operated by a first Mobile Network Operator (MNO), and where the second ATSSS rule includes second traffic descriptor information corresponding to the first type of traffic or a second type of traffic and second steering mode information including a second network indicator corresponding to a second 3GPP access network operated by the first MNO or a second MNO; transmit the first type of traffic corresponding to the first traffic descriptor information included in the first ATSSS rule to the first 3GPP access network operated by the first MNO; and transmit the first type of traffic or the second type of traffic corresponding to the second traffic descriptor information included in the second ATSSS rule to the second 3GPP access network operated by the first MNO or the second MNO.

The actions may further include: transmit the first type of traffic corresponding to the first traffic descriptor information included in the first ATSSS rule to the first 3GPP access network operated by the first MNO using a Multipoint Transmission Control Protocol (MPTCP), and transmit the first type of traffic or the second type of traffic corresponding to the second traffic descriptor information included in the second ATSSS rule to the second 3GPP access network operated by the first MNO or the second MNO using the MPTCP.

The actions may further include: transmit the first type of traffic corresponding to the first traffic descriptor information included in the first ATSSS rule to the first 3GPP access network operated by the first MNO using a Multipath Quick User Datagram Protocol (UPD) Internet Connection (MPQUIC) protocol, and transmit the first type of traffic or the second type of traffic corresponding to the second traffic descriptor information included in the second ATSSS rule to the second 3GPP access network operated by the first MNO or the second MNO using the MPQUIC protocol.

The second steering mode information included in the second ATSSS rule may include the first network indicator corresponding to the first 3GPP access network operated by the first MNO and the second network indicator corresponding to the second 3GPP access network operated by the first MNO or the second MNO, and the actions may further include, before or after the first type of traffic or the second type of traffic corresponding to the second traffic descriptor information included in the second ATSSS rule is transmitted to the second 3GPP access network operated by the first MNO or the second MNO, transmit the first type of traffic or the second type of traffic corresponding to the second traffic descriptor information included in the second ATSSS rule to the first 3GPP access network operated by the first MNO.

The ATSSS rules include a third ATSSS rule, the third ATSSS rule may include third traffic descriptor information corresponding to a third type of traffic and steering mode information indicating smallest delay, and the actions may further include: determine a first Round-Trip Time (RTT) corresponding to the first 3GPP access network operated by the first MNO, determine a second RTT corresponding to the second 3GPP access network operated by the first MNO or the second MNO, if the first RTT is greater than the second RTT, transmit the third type of traffic corresponding to the third traffic descriptor information included in the third ATSSS rule to the second 3GPP access network operated by the first MNO or the second MNO, and if the first RTT is less than the second RTT, transmit the third type of traffic corresponding to the third traffic descriptor information included in the third ATSSS rule to the first 3GPP access network operated by the first MNO.

The ATSSS rules may include a third ATSSS rule, the third ATSSS rule may include third traffic descriptor information corresponding to an application and steering mode information indicating a first percentage corresponding to the first 3GPP access network operated by the first MNO and a second percentage corresponding to the second 3GPP access network operated by the first MNO or the second MNO, and the actions further include: transmit first traffic corresponding to the application to the first 3GPP access network operated by the first MNO based on the first percentage corresponding to the first 3GPP access network operated by the first MNO, and transmit second traffic corresponding to the application to the second 3GPP access network operated by the first MNO or the second MNO based on the second percentage corresponding to the second 3GPP access network operated by the first MNO or the second MNO.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings.

FIGS. 5A, 5B, and 5C are diagrams for explaining operation of a communication system in accordance with embodiments described herein.

DETAILED DESCRIPTION

Figure 1:
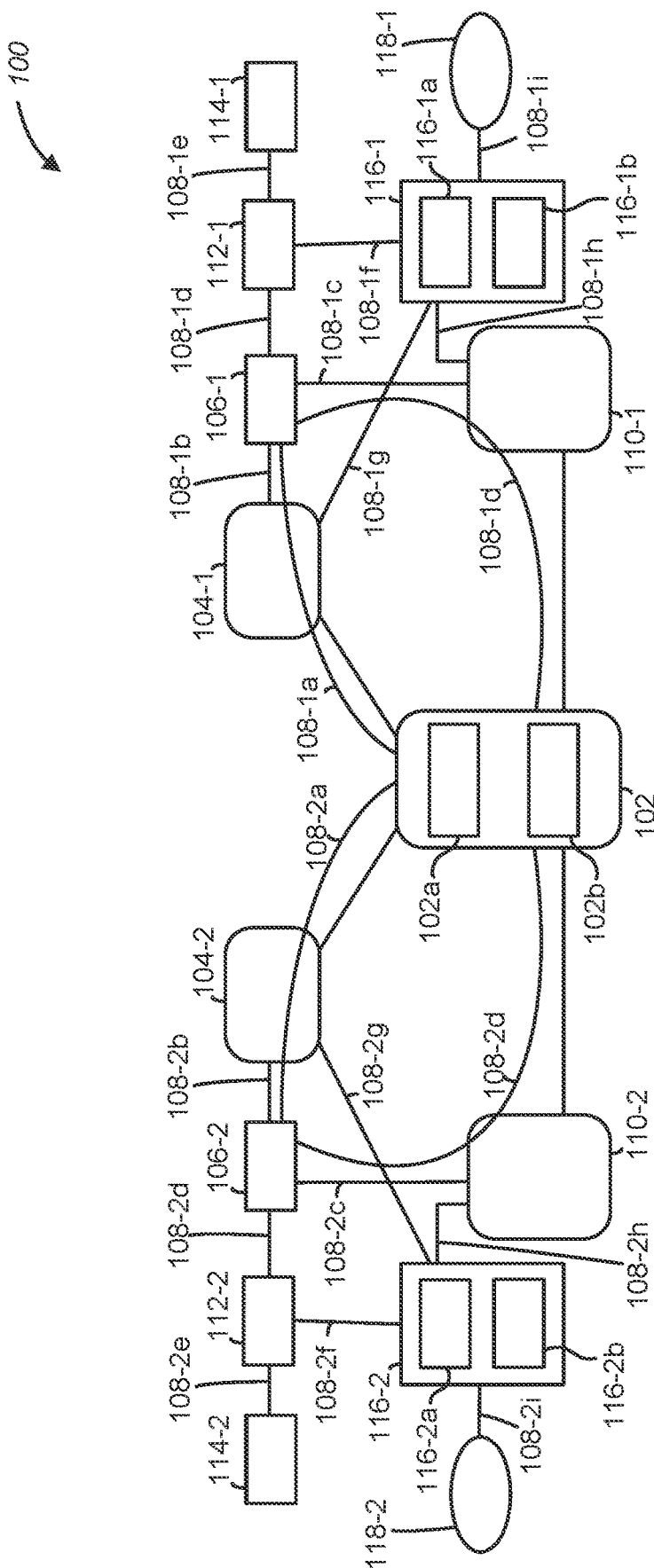
FIG. 1 is a block diagram illustrating a communication system in accordance with embodiments described herein.

FIG. 1 is a block diagram illustrating a communication system 100 in accordance with embodiments described herein. The communication system 100 include a User Equipment (UE) device 102 that can simultaneously be communicatively coupled to two 3GPP access networks, including 3GPP access network 104-1 and 3GPP access network 104-2. The UE device 102 includes a transport layer module 102a and an Access Traffic Steering Switching and Splitting (ATSSS) Lower Layer (LL) module 102b. In one or more implementations, the transport layer module 102a causes the UE device 102 to perform MPTCP according to Request for Comments (RFC) 8684 from the Internet Engineering Task Force (IETF). MPTCP is compatible with legacy TCP hardware (e.g., creates no issues for firewalls, etc.), enables paths to be added and removed (e.g., by an application) to handle connection loss, supports fair congestion control strategy between different links, uses sub-flows with multiple standard TCP connections, and handles congestion control and reliability using a modified retransmission protocol. In one or more implementations, the transport layer module 102a causes the UE device 102 to perform MPQUIC from the IETF. MPQUIC is connectionless (e.g., can be used with User Datagram Protocol (UDP) traffic), is secure (e.g., can be used with Transport Layer Security (TLS) 1.3) and can be used with advanced traffic (e.g., Hypertext Transfer Protocol (HTTP) 2 (HTTP2) traffic). In one or more implementations, the ATSSS-LL module 102b causes the UE device 102 to perform ATSSS according to 3GPP Technical Specification (TS) 23.501 (Release 18).

The 3GPP access network 104-1 is communicatively coupled to an Access and Mobility Management Function (AMF) device 106-1, which is communicatively coupled to a non-3GPP access network 110-1 and a Session Management Function (SMF) device 112-1. The UE device 102 communicates with the AMF device 106-1 using an N1 interface 108-1a. The 3GPP access network 104-1 communicates with the AMF device 106-1 using an N2 interface 108-1b. The AMF device 106-1 communicates with the non-3GPP access network 110-1 using an N2 interface 108-1c. The AMF device 106-1 communicates with the SMF device 112-1 using an N11 interface 108-1d.

The SMF device 112-1 is communicatively coupled to a Policy Control Function (PCF) device 114-1 and a User Plane Function (UPF) device 116-1. The UPF device 116-1 is communicatively coupled to the 3GPP access network 104-1, the non-3GPP access network 110-1, and a Data Network (DN) device 118-1. The UPF device 116-1 includes an MPTCP proxy module 116-1a and a Protected Management Frames (PMF) module 116-1b. In one or more implementations, the MPTCP proxy module 116-1a causes the UPF device 116-1 to perform MPTCP proxy functionality according to RFC 8684. In one or more implementations, the PMF device 116-1b causes the UPF device 116-1 to perform PMF functions according to a standard defined by the WiFi Alliance.

The SMF device 112-1 communicates with the PCF device 114-1 using an N7 interface 108-1e. The SMF device 112-1 communicates with the UPF device 116-1 using an N4 interface 108-1f. The UPF device 116-1 communicates with the 3GPP access network 104-1 using an N4 interface 108-1g. The UPF device 116-1 communicates with the non-3GPP access network 110-1 using an N3 interface 108-1h for Non-3GPP Inter-Working Function (N3IWF) (WiFi) and using S2b interface for Evolved Packet Data Gateway (ePDG) (WiFi). The UPF device 116-1 communicates with the DN 118-1 using an N6 interface 108-1i.

The 3GPP access network 104-2 is communicatively coupled to an AMF device 106-2, which is communicatively coupled to a non-3GPP access network 110-2 and a SMF device 112-2. The UE device 102 communicates with the AMF device 106-2 using an N1 interface 108-2a. The 3GPP access network 104-2 communicates with the AMF device 106-2 using an N2 interface 108-2b. The AMF device 106-2 communicates with the non-3GPP access network 110-2 using an N2 interface 108-2c for N3IWF (WiFi). The AMF device 106-2 communicates with the SMF device 112-2 using an N11 interface 108-2d.

The SMF device 112-2 is communicatively coupled to a PCF device 114-2 and a UPF device 116-2. The UPF device 116-2 is communicatively coupled to the 3GPP access network 104-2, the non-3GPP access network 110-2, and a DN 118-2. The UPF device 116-2 includes an MPTCP proxy module 116-2a and a PMF module 116-2b. In one or more implementations, the MPTCP proxy module 116-2a causes the UPF device 116-2 to perform MPTCP proxy functionality according to RFC 8684. In one or more implementations, the PMF device 116-2b causes the UPF device 116-2 to perform PMF functions according to a standard defined by the WiFi Alliance.

The SMF device 112-2 communicates with the PCF device 114-2 using an N7 interface 108-2e. The SMF device 112-2 communicates with the UPF device 116-2 using an N4 interface 108-2f. The UPF device 116-2 communicates with the 3GPP access network 104-2 using an N3 interface 108-2g. The UPF device 116-2 communicates with the non-3GPP access network 110-2 using an N3 interface 108-2h for N3IWF (WiFi) and using an S2b interface for ePDG (WiFi). The UPF device 116-2 communicates with the DN 118-2 using an N6 interface 108-2i.

In the example of FIG. 1, the 3GPP access network 104-1, the AMF device 106-1, the non-3GPP access network 110-1, the SMF device 112-1, the PCF device 114-1, the UPF device 116-1, and the DN 118-1 are operated by a first mobile network operator (e.g., DISH Network), and the 3GPP access network 104-2, the AMF device 106-2, the non-3GPP access network 110-2, the SMF device 112-2, the PCF device 114-2, and the UPF device 116-2, are operated by a second mobile network operator (e.g., AT&T). In addition, the UE device 102 is operated by a subscriber of the first mobile network operator. In one or more embodiments, the AMF device 106-1, the SMF device 112-1, the PCF device 114-1, and the UPF device 116-1, are implemented in a public cloud computing environment (e.g., Amazon Web Services (AWS)).

The first mobile network operator configures and pushes ATSSS rules to the UE device 102. In one or more implementations, ATSSS rules are preconfigured in the UE device 102. In one or more implementations, the PCF device 114-1 configures ATSSS rules in the UE device 102. The ATSSS rules dictates how traffic to and from the UE device 102 should be routed through 3GPP and non-3GPP access networks, such as the 3GPP access network 104-1 and the non-3GPP access network 110-1. The ATSSS rules are stored by both the UE device 102 and the SMF device 112-1, in addition to the PCF device 114-1 and Unified Data Management (UDM)/Unified Data Repository (UDR) devices. The ATSSS rules are used by the UE device 102 and the SMF device 112-1 to perform steering functions. The steering functions include higher layer steering functions and lower layer steering functions. In one or more implementation, the higher layer steering functions are performed using MPTCP on Layer 4. In one or more implementation, the lower layer steering functions include placing the access networks in an active state or a standby state, determining a shortest round trip time for traffic, performing load balancing across the access networks, and performing priority based routing based on a higher priority being assigned to one of the access networks.

Figure 2:
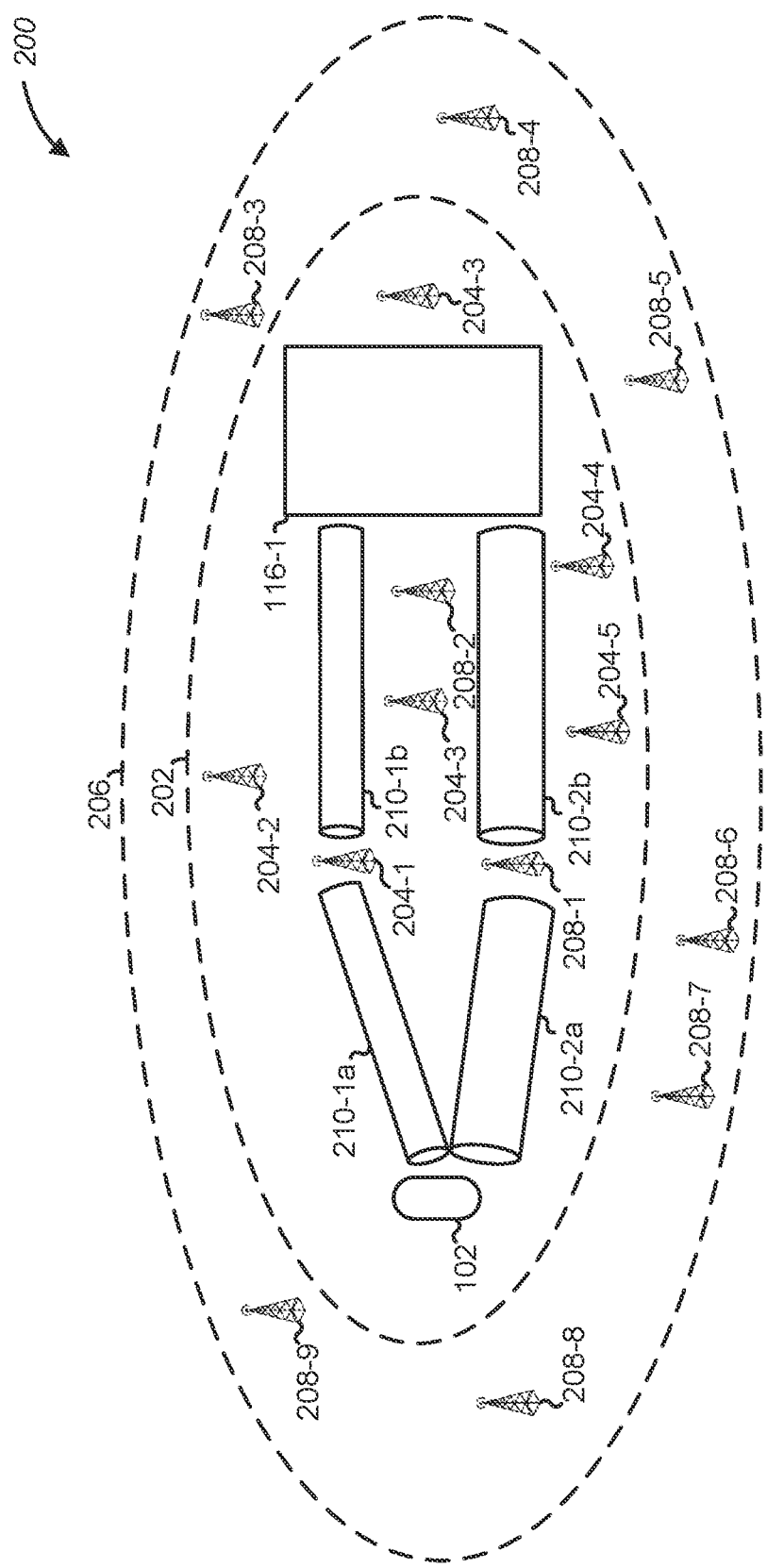
FIG. 2 is a diagram for explaining operation of a communication system in accordance with embodiments described herein.

FIG. 2 is a diagram for explaining operation of a communication system in accordance with embodiments described herein. More particularly, FIG. 2 shows an area 200 that includes a first coverage area 202 in which a plurality of 5G NR gNodeB (gNB) devices (e.g., base station devices) is disposed, including gNB device 204-1, gNB device 204-2, gNB device 204-3, and gNB device 204-4, which are operated by a first mobile network operator (e.g., DISH Network). Also, the area 200 includes a second coverage area 206 in which a plurality of 4G eNodeB (eNB) devices (or NR gNodeB (gNB) devices) (e.g., base station devices) is disposed, including eNB or gNB device 208-1, eNB or gNB device 208-2, eNB or gNB device 208-3, eNB or gNB device 208-4, eNB or gNB device 208-5, eNB or gNB device 208-6, eNB or gNB device 208-7, eNB or gNB device 208-8, and eNB or gNB device 208-9, which are operated by a second mobile network operator (e.g., AT&T).

A MUSIM-enabled User Equipment (UE) device 102 uses ATSSS rules to select the gNB device 204-1 to send traffic of a first type to a User Plane Function (UPF) device 116-1 that is operated by the first mobile network operator (as described in connection with FIG. 1) via a communication link 210-1a. The UPF device 116-1 operated by the first mobile network operator uses the ATSSS rules to select the gNB device 204-1 to send traffic of the first type to the UE device 102 via a communication link 210-1b. Also, the UE device 102 uses the ATSSS rules to select the eNB or gNB device 208-1 to send traffic of the first type or a second type to the UPF device 116-1 operated by the first mobile network operator via a communication link 210-2a. The UPF device 116-1 operated by the first mobile network operator uses the ATSSS rules to connect to the eNB or gNB device 208-1 directly or through a UPF device operated by the second mobile network operator to send traffic of the first type of the second type of to the UE device 102 via a communication link 210-2b.

Accordingly, the UE device 102 simultaneously connects to two different networks operated by the same mobile network operator or two different mobile network operators. The transport layer module 102a (e.g., using MPTCP or MPQUIC) causes the UE device 102 to detect whether a first link with the gNB device 104-1 or a second link with the eNB or gNB device 208-1 is better, and to adjust traffic loads over the two links/sub-flows. For example, the UE device 102 routes more traffic over a better link among the first and second links.

In the example of FIG. 2, all Data Network Names (DNNs) are anchored at the UPF device 116-1 operated by the first mobile network operator. This provides better network access for the user of the UE device 102 compared to a configuration in which the UE device 102 is connected to only one network. For example, the traffic to and from the UE device 102 has higher throughput, reduced latency, and higher reliability compared to a configuration in which the UE device 102 is connected to only one network.

Figure 3:
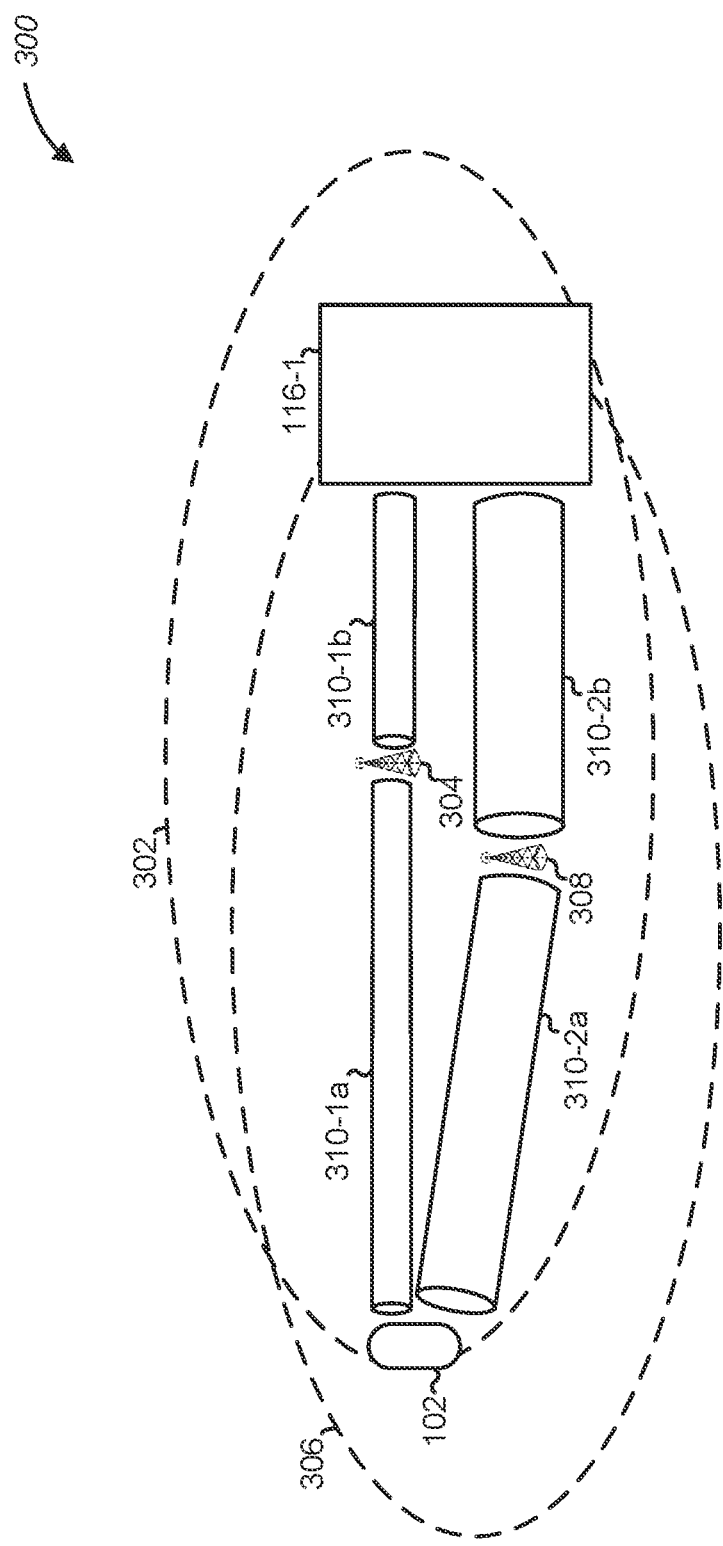
FIG. 3 is another diagram for explaining operation of a communication system in accordance with embodiments described herein.

FIG. 3 is another diagram for explaining operation of a communication system in accordance with embodiments described herein. More particularly, FIG. 3 shows an area 300 that includes a first coverage area 302 including a 5G NR gNodeB (gNB) device (e.g., base station device) 304, which is operated by a first mobile network operator (e.g., DISH Network). Also, the area 300 includes a second coverage area 306 including a 4G eNodeB (eNB) (or 5G NR gNodeB (gNB) device (e.g., base station device) 308, which is operated by a second mobile network operator (e.g., AT&T).

A MUSIM-enabled User Equipment (UE) device 102 uses ATSSS rules to select the gNB device 304 to send traffic of a first type to a User Plane Function (UPF) device 116-1 operated by the first mobile network operator via a communication link 310-1a. The UPF device 116-1 operated by the first mobile network operator uses the ATSSS rules to select the device gNB device 304 to send traffic of the first type to the UE device 102 via a communication link 310-1b. Also, the UE device 102 uses the ATSSS rules to select the eNB or gNB device 308 to send traffic of the first type or a second type to the UPF device 116-1 operated by the first mobile network operator via a communication link 310-2a. The UPF device 116-1 operated by the first mobile network operator uses the ATSSS rules to connect to the eNB device 308 directly or through a UPF device operated by the second mobile network operator to send traffic of the first type of the second type of to the UE device 102 via a communication link 310-2b.

In the example of FIG. 3, an edge of the coverage area 302 including the first mobile network operator is not an edge of the coverage area 306 including the second mobile network operator. In other words, the cell edge for the first mobile network operator is not the cell edge for the second mobile network operator. At the edge of the coverage area 302, the UE device still receives signals with an acceptable signal quality (e.g., SNR, SNIR) from the eNB or gNB device 308 in the coverage area 306. Accordingly, the MPTCP (or MPQUIC) process performed by the UE device 102 routes traffic over the better link/sub-flow.

Figure 4A:
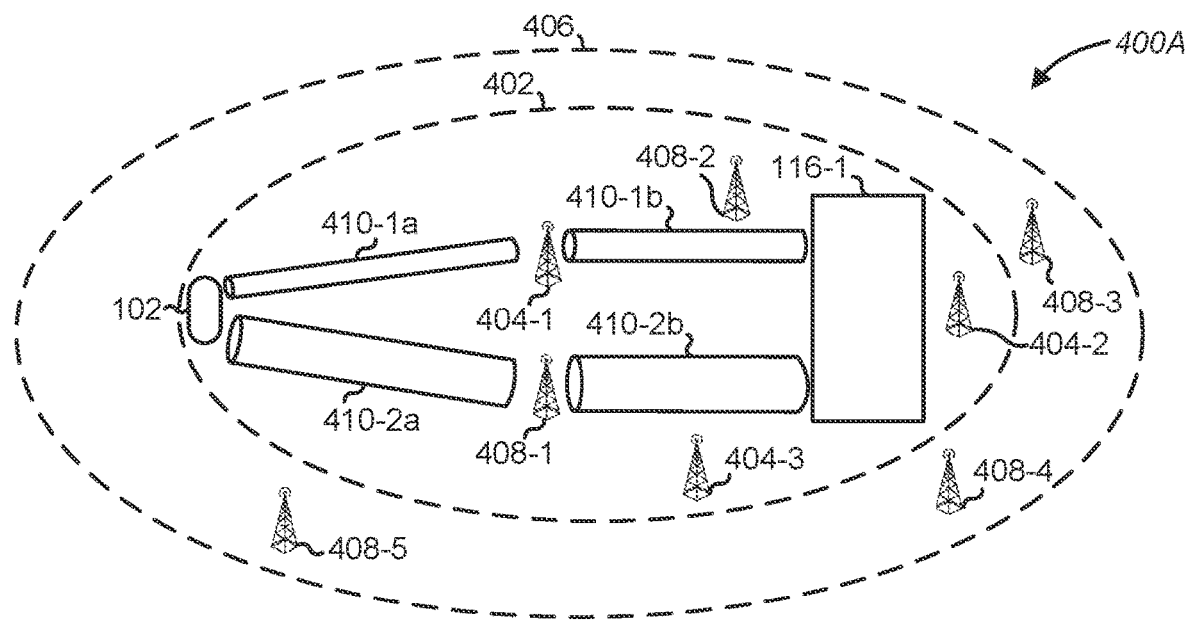
FIGS. 4A and 4B are diagrams for explaining operation of a communication system in accordance with embodiments described herein.
Figure 4B:
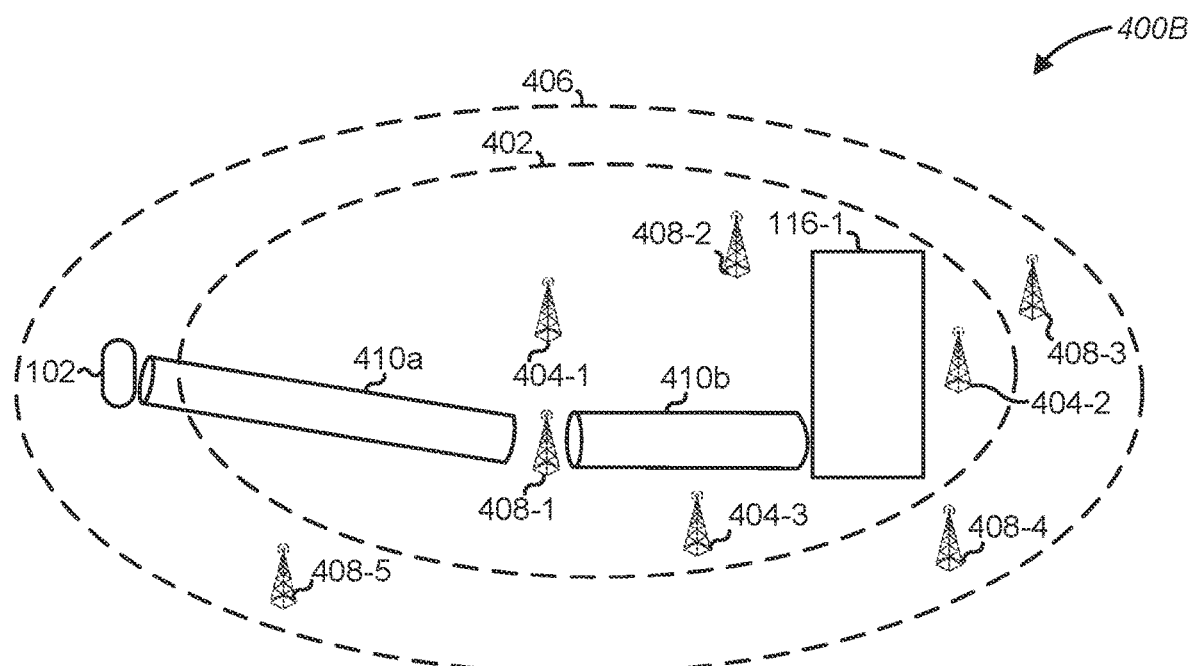

FIGS. 4A and 4B are diagrams for explaining operation of a communication system in accordance with embodiments described herein. More particularly, FIG. 4A shows an area 400A that includes a first coverage area 402 in which a plurality of 5G NR gNodeB (gNB) devices (e.g., base station device) is disposed, including gNB device 404-1, gNB device 404-2, and 404-3, which are operated by a first mobile network operator (e.g., DISH Network). Also, the area 400A includes a second coverage area 406 in which a plurality of 4G eNodeB (eNB) (or 5G NR gNodeB (gNB)) devices (e.g., base station device) is disposed, including eNB or gNB device 408-1, eNB or gNB device 408-2, eNB or gNB device 408-3, eNB or gNB device 408-4, and eNB or gNB device 408-5, which are operated by a second mobile network operator (e.g., AT&T).

A MUSIM-enabled User Equipment (UE) device 102 uses ATSSS rules to select the gNB device 404-1 to send traffic of a first type to a User Plane Function (UPF) device 116-1 operated by the first mobile network operator via a communication link 410-1a. The UPF device 116-1 operated by the first mobile network operator uses the ATSSS rules to select the gNB device 404-1 to send traffic of the first type to the UE device 102 via a communication link 410-1*b*. Also, the UE device 102 uses the ATSSS rules to select the eNB or gNB device 408-1 to send traffic of the first type or a second type to the UPF device 116-1 operated by the first mobile network operator via a communication link 410-2*a*. The UPF device 116-1 operated by the first mobile network operator uses the ATSSS rules to connect to the eNB or gNB device 408-1 directly or through a UPF device operated by the second mobile network operator to send traffic of the first type or the second type of to the UE device 102 via a communication link 410-2*b*.

FIG. 4B shows an area 400B that is similar to the area 400A shown in FIG. 4A, except that the UE device 102 has moved out of the first coverage area 402. The UE device 102 uses the ATSSS rules to select the eNB or gNB device 408-1 to send of all types to the UPF device 116-1 operated by the first mobile network operator traffic via a communication link 410-*a*. The UPF device 116-1 operated by the first mobile network operator uses the ATSSS rules to select the eNB or gNB device 408-1 to send traffic of all types to the UE device 102 via a communication link 410-*b*.

According to the example of FIGS. 4A and 4B, the UE device 102 is enabled to perform a seamless handover when the UE device 102 is connected to two networks, or when the UE device 102 moves out of a coverage area.

FIGS. 5A, 5B, and 5C are diagrams for explaining operation of a communication system in accordance with embodiments described herein. In the example of FIGS. 5A, 5B, and 5C, assume that a first mobile network operator (e.g., DISH Network) has a first public land mobile network (PLMN) and a second PLMN. Also, assume a second mobile network operator (e.g., AT&T) has a third PLMN.

FIG. 5A shows an area 500A that includes a first coverage area 502 including a plurality of 5G NR gNodeB (gNB) devices (e.g., base station device), including gNB device 504-1, gNB device 504-2, and gNB device 504-3, which are operated by a first mobile network operator (e.g., DISH Network). Also, the area 500A includes a second coverage area 506 in which a gNB device 504-4 that is operated by the first mobile network operator is disposed, along with a plurality of 4G eNodeBs (eNBs) (or 5G NR gNodeB (gNBs)) devices (e.g., base station device) is disposed, including eNB or gNB device 508-1, eNB or gNB device 508-2, eNB or gNB device 508-3, and eNB or gNB device 508-4, which are operated by a second mobile network operator (e.g., AT&T). In addition, the area 500A includes a third coverage area 510 in which a plurality of 4G eNodeBs (eNBs) (or 5G NR gNodeB (gNBs)) devices (e.g., base station device) is disposed, including eNB or gNB device 512-1, eNB or gNB device 512-2, eNB or gNB device 512-3, eNB or gNB device 512-4, eNB or gNB device 512-5, and eNB or gNB device 512-6, which are operated by the second mobile network operator.

In the first coverage area 502, the gNB device 504-1, gNB device 504-2, and gNB device 504-3, which are operated by the first mobile network operator, broadcast information indicating the first PLMN. In addition, the eNB or gNB device 508-1 and eNB or gNB device 508-2, which are operated by the second mobile network operator, broadcast information indicating the second PLMN.

In an area between the first coverage area 502 and second coverage area 506, the gNB device 504-4, which is operated by the first mobile network operator, broadcasts information indicating the first PLMN. In addition, the eNB or gNB device 508-3 and eNB or gNB device 508-4, which are operated by the second mobile network operator, broadcast information indicating the second PLMN for devices operated by subscribers of the second mobile network operator, and also broadcast information indicating the third PLMN for devices operated by subscribers of the first mobile network operator.

In the third coverage area 510, the eNB or gNB device 512-1, eNB or gNB device 512-2, eNB or gNB device 512-3, eNB or gNB device 512-4, eNB or gNB device 512-5, and eNB or gNB device 512-6 broadcast information indicating the second PLMN.

FIG. 5A shows a configuration in which a MUSIM-enabled User Equipment (UE) device 102 is located in the first coverage area 502. The UE device 102 is connected to a 3GPP access network operated the first mobile network operator using the information indicating the first PLMN broadcast by the gNB device 504-1. The UE device 102 uses ATSSS rules to select the gNB device 504-1 to send traffic of all types a User Plane Function (UPF) device 116-1 operated by the first mobile network operator via a communication links 514*a*. The UPF device 116-1 operated by the first mobile network operator uses the ATSSS rules to select the gNB device 504-1 to send traffic of all types to the UE device 102 via a communication link 514*b*.

FIG. 5B shows an area 500B that is similar to the area 500A shown in FIG. 5A, except that the UE device 102 is located in the area between the first coverage area 502 and the second coverage area 506. The UE device 102 is connected to the 3GPP access network operated the first mobile network operator using the information indicating the first PLMN broadcast by the gNB device 504-1, and is connected to a 3GPP access network operated the second mobile network operator using the information indicating the second PLMN broadcast by the eNB or gNB device 508-4. The UE device 102 performs uses ATSSS rules to select the gNB device 504-4 to send traffic of a first type to the UPF device 116-1 operated by the first mobile network operator via a communication link 516-1*a*. The UPF device 116-1 operated by the first mobile network operator uses the ATSSS rules to select the gNB device 504-4 to send traffic of the first type to the UE device 102 via a communication link 516-1*b*. Also, the UE device 102 uses the ATSSS rules to select the eNB or gNB device 508-4 to send traffic of the first type or a second type to the UPF device 116-1 operated by the first mobile network operator via a communication link 516-2*a*. The UPF device 116-1 operated by the first mobile network operator uses the ATSSS rules to connect to the eNB or gNB device 508-4 directly or through the UPF of the second network operator to send traffic of the first type or the second type to the UE device 102 via a communication link 516-2*b*.

FIG. 5C shows an area 500C that is similar to the area 500B shown in FIG. 5B, except that the UE device 102 is located in the third coverage area 510. The UE device 102 is connected to the 3GPP access network operated the second mobile network operator using the information indicating the third PLMN broadcast by the eNB or gNB device 512-1. The UE device 102 uses the ATSSS rules to select the eNB or gNB device 512-1 to send traffic of all types to the UPF device 116-1 operated by the first mobile network operator via a communication link 518*a*. The UPF device 116-1 operated by the first mobile network operator uses the ATSSS rules to select the eNB or gNB device 512-1 to send traffic of all types to the UE device 102 via a communication link 518*b*.

If the UE device 102 performs a handover from the configuration shown in FIG. 5B to the configuration shown in FIG. 5C, the UE device 102 switches from being connected to the second mobile network operator using the information indicating the second PLMN, to being connected to the second mobile network operator using the information indicating the third PLMN. Accordingly, the communication links 516-1a and 516-1b are dropped. In response, a MPTCP (or MPQUIC) process executing on the UE device 102 smoothly routes all traffic according to the ATSSS rules, including traffic previously routed to the communication link 516-1a before the communication links 516-1a was dropped, to the communication link 518-1a.

If the UE device 102 performs a handover from the configuration shown in FIG. 5C to the configuration shown in FIG. 5B, the UE device 102 switches from being connected to the 3GPP access network operated by the second mobile network operator using the information indicating the third PLMN, to being connected to the 3GPP access network operated by the second mobile network operator using the information indicating the second PLMN. Also, the UE device 102 connects to the 3GPP access network operated by the first mobile network operator using the information indicating the first PLMN, which causes the communication links 516-1a and 516-1b to be established. In response, a MPTCP (or MPQUIC) process executing on the UE device 102 smoothly routes some of the traffic according to the ATSSS rules to the communication link 516-1a.

Figure 6:
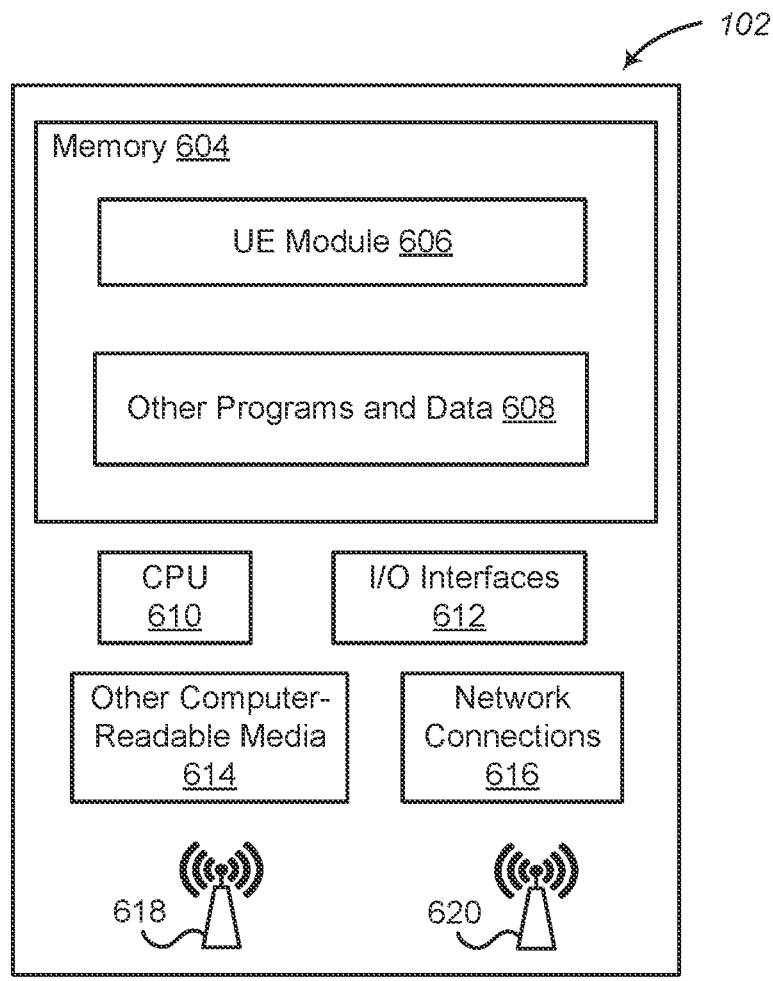
FIG. 6 is a block diagram illustrating an example of a User Equipment (UE) device in accordance with embodiments described herein.

FIG. 6 is a block diagram illustrating an example of a User Equipment (UE) device 102 in accordance with embodiments described herein. In some embodiments, one or more special-purpose computing systems may be used to implement the UE device 102. Accordingly, various embodiments described herein may be implemented in software, hardware, firmware, or in some combination thereof. The UE device 102 may include one or more memory devices 604, one or more central processing units (CPUs) 610, I/O interfaces 612, other computer-readable media 614, network connections 616, a radio transceiver 618, and a radio transceiver 620.

The one or more memory devices 604 may include one or more various types of non-volatile and/or volatile storage technologies. Examples of the one or more memory devices 604 may include, but are not limited to, flash memory, hard disk drives, optical drives, solid-state drives, various types of random access memory (RAM), various types of read-only memory (ROM), a Multi-Universal Mobile Telecommunications System (UMTS) Subscriber Identity Module (MUSIM) card, other computer-readable storage media (also referred to as processor-readable storage media), or the like, or any combination thereof. The one or more memory devices 604 may be utilized to store information, including computer-readable instructions that are utilized by the one or more CPUs 610 to perform actions, including those of embodiments described herein. In one or more implementations, the one or more CPUs 610 cause the UE device 102 to determine a network selection policy, which the UE device 102 uses to select a public land mobile network (PLMN), for example, when a handover of the UE device 102 is performed.

The one or more memory devices 604 may have stored thereon a UE module 606. The UE module 606 is configured to implement and/or perform some or all of the functions of the UE device 102 described herein and interface with the radio transceivers 618 and 620. The one or more memory devices 604 may also store other programs and data 608, which may include ATSSS rules, digital certificates, information regarding subscriber identification (e.g., from a MUSIM card included in the UE device 102), network protocols, O-RAN operating rules, user interfaces, operating systems, etc. In addition, the UE module 606 includes other modules, such as the transport layer module 102a and the ATSSS-LL module 102b discussed in connection with FIG. 1, for example.

Network connections 616 are configured to communicate with other computing devices including an eNB device or a gNB device, for example. The network connections 616 may be used to communicate User Plane (UP) and Control Plane (CP) information. The network connections 616 may be associated with logical channels between the Medium Access Control (MAC) sublayer of 5G NR protocol stack to the Radio Link Control (RLC) sublayer of 5G NR protocol stack, which carry CP information and UP information. Also, the network connections 616 may be associated with between the Physical (PHY) sublayer of 5G NR protocol stack to the MAC sublayer of 5G NR protocol stack, which describe how information is carried. Additionally, the network connections 616 may be associated with physical channels that carry information on an air interface provided by the radio transceiver 618.

The radio transceiver 618 transmits and receives signals in the 5G NR frequency bands, including the Frequency Range 1 (FR1) bands, which includes sub-6 GHz frequency bands, and Frequency Range 2 bands, which includes frequency bands from 24.25 GHz to 71.0 GHz. In one or more implementations, the radio transceiver 618 transmits and receives information using Multiple Input Multiple Output (MIMO) radio link technology. In one or more implementations, the radio transceiver 618 includes one or more oscillators, radio frequency (RF) filters, amplifiers, beamforming circuitry, and antennas arranged to perform 5G NR communications. In one or more implementations, the radio transceiver 618 simultaneously connects to multiple 3GPP network connections using multiple International Mobile Equipment Identifiers (IMEIs), each of which is associated with a particular subscriber profile included in the MUSIM.

The radio transceiver 620 transmits and receives signals in one or more frequency bands used for Wireless Local Area Network (WLAN) communications, including 2.4 GHz frequency bands, 5 GHz frequency bands, and 6 GHz frequency bands. In one or more implementations, the radio transceiver 620 transmits and receives data according to the IEEE 802.11ax communication standard (e.g., Wi-Fi 6). In one or more implementations, the radio transceiver 618 connects to multiple non-3GPP networks connections using multiple IMEIs, each of which is associated with a particular subscriber profile included in the MUSIM.

Figure 7:
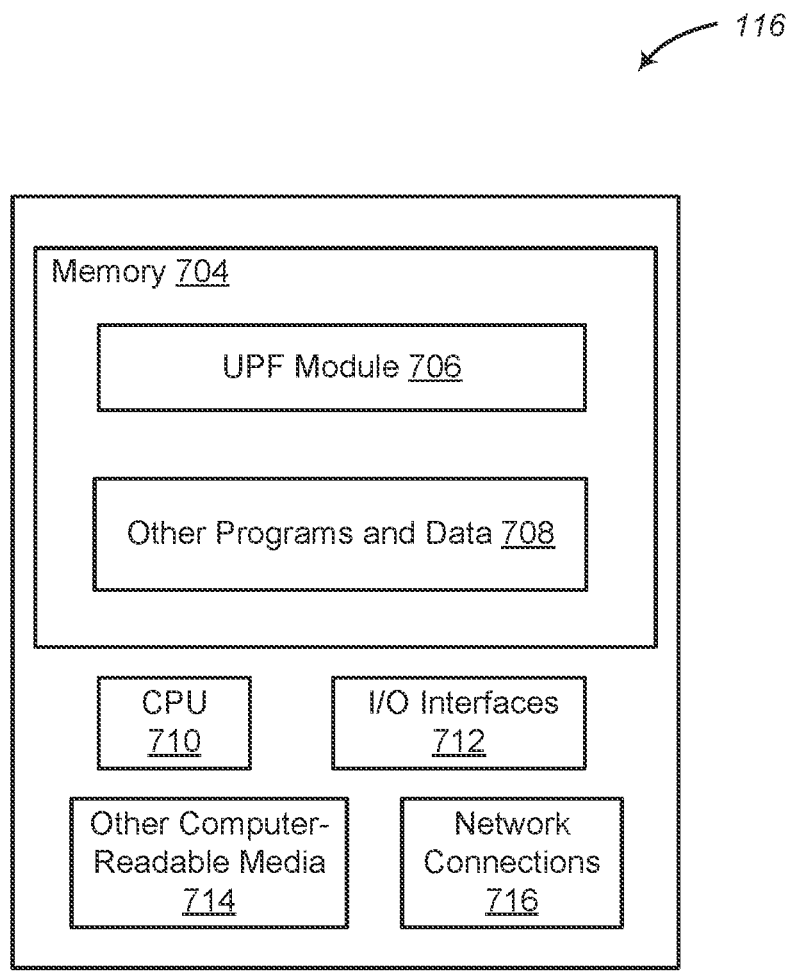
FIG. 7 is a block diagram illustrating an example of a User Plane Function (UPF) device in accordance with embodiments described herein.

FIG. 7 is a block diagram illustrating an example of a User Plane Function (UPF) device 116 in accordance with embodiments described herein. In some embodiments, one or more special-purpose computing systems may be used to implement the UPF device 116. Accordingly, various embodiments described herein may be implemented in software, hardware, firmware, or in some combination thereof. The UPF device 116 may include one or more memory devices 704, one or more central processing units (CPUs) 710, I/O interfaces 712, other computer-readable media 714, and network connections 716.

The one or more memory devices 704 may include one or more various types of non-volatile and/or volatile storage technologies. Examples of the one or more memory devices 704 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 704 may be utilized to store information, including computer-readable instructions that are utilized by the one or more CPUs 710 to perform actions, including those of embodiments described herein.

The one or more memory devices 704 may have stored thereon a UPF module 706. The UPF module 706 is configured to implement and/or perform some or all of the functions of the UPF device 116 described herein. The UPF module 706 is configured to perform UPF functions of a core 5G network, for example, as described in 3GPP Technical Specification (TS) 23.501. The UPF module 706 causes the UPF device 116 to perform User Plane (UP) packet forwarding and routing. Also, the UPF module 706 causes the UPF device 116 to function as an anchor point for mobility.

More particularly, the UPF module 706 causes the UPF device 116 to function as an interconnect point between a mobile infrastructure and a Data Network (DN), for example, by performing encapsulation and encapsulation of General Packet Radio Services (GPRS) Tunneling Protocol for the UP (GTP-U). Also, the UPF module 706 causes the UPF device 116 to function as a Protocol Data Unit (PDU) session anchor point for providing mobility within and between Radio Access Technologies (RATs), including sending one or more end marker packets to a gNB device. Additionally, the UPF module 706 causes the UPF device 116 to perform packet routing and forwarding, including performing the role of an Uplink Classifier/UL-CL, by directing flows to specific data networks based on traffic matching filters, and a Branching point, when acting as an Intermediate UPF (I-UPF) multi-homed to more than one PDU session anchor (PSA). Further, the UPF module 706 causes the UPF device 116 to perform application detection using Service Data Flow (SDF) traffic filter templates or 3-tuple (i.e., protocol, server-side IP address and port number) Packet Flow Description (PFD) received from the Session Management Function (SMF). In addition, the UPF module 706 causes the UPF device 116 to perform per-flow Quality of Service (QoS) handling, including transport level packet marking for uplink (UL) and downlink (DL), rate limiting and reflective QoS (e.g., Differentiated Services Code Point (DSCP)) marking on the DL. Moreover, the UPF module 706 causes the UPF device 116 to perform traffic usage reporting for billing and the Lawful Intercept (LI) collector interface.

The one or more memory devices 704 may also store other programs and data 708, which may include digital certificates, subscriber identification information, ATSSS rules, network protocols, O-RAN operating rules, user interfaces, operating systems, etc.

Network connections 716 are configured to communicate with other computing devices including a gNB device of a Radio Access Network (RAN) using an N3 interface, for example. Also, the network connections 716 are configured to communicate with another UPF device (i.e., Intermediate I-UPF device and UPF Session Anchor device) using an N9 interface. Additionally, the network connections 716 are configured to communicate with a DN using an N6 interface. In addition, the network connections 716 are configured to communicate with a Session Management Function (SMF) device using an N4 interface.

Figure 8:
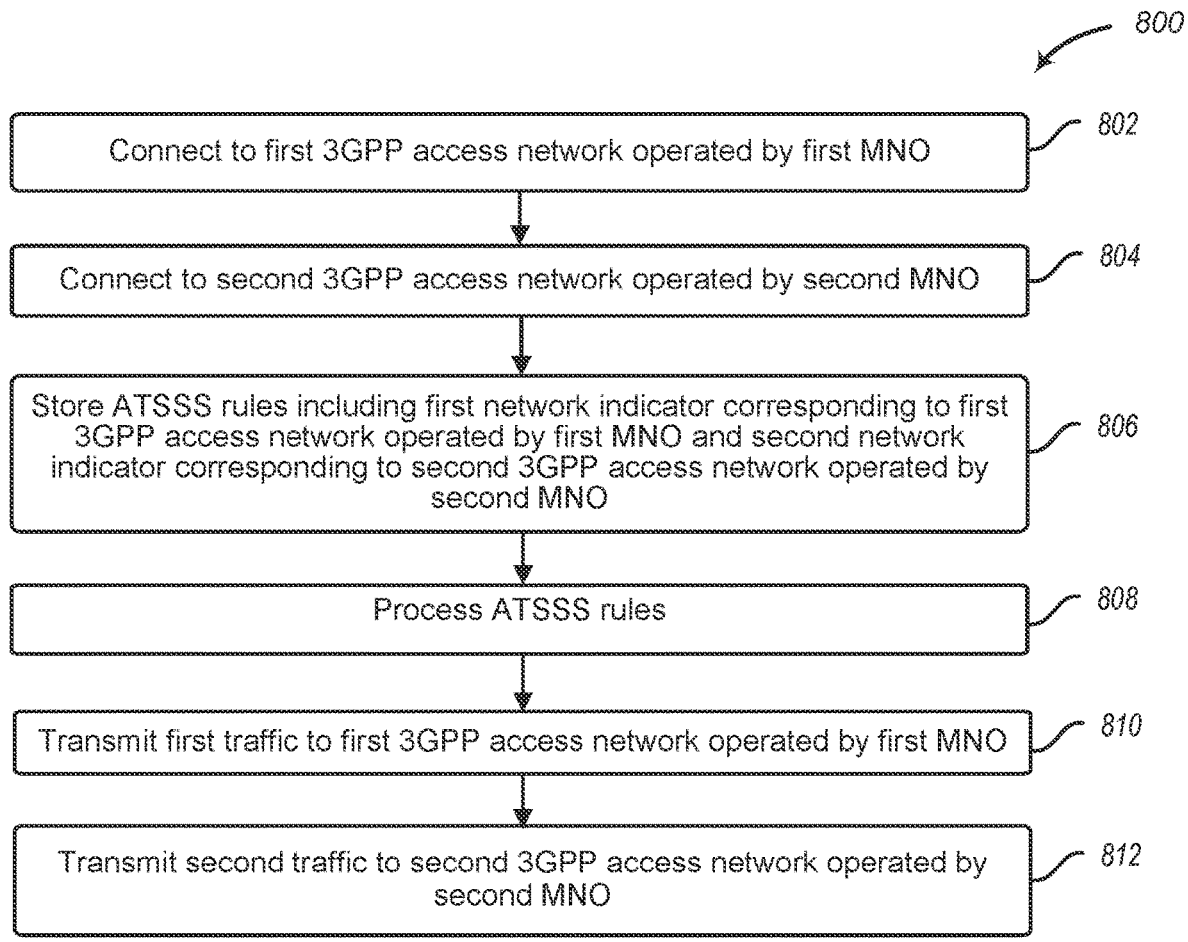
FIG. 8 illustrates a logical flow diagram showing an example of a method of operating a UE device in accordance with embodiments described herein.

FIG. 8 illustrates a logical flow diagram showing an example of a method 800 of operating a UE device in accordance with embodiments described herein. The method 800 begins at 802.

At 802, a User Equipment (UE) device connects to a first 3GPP access network operated by a first mobile network operator (MNO). For example, the UE device 102 shown in FIG. 1 connects to the 3GPP access network 104-1 that is operated by a first MNO (e.g., DISH Network) using information included in a MUSIM (e.g., first authentication key, first International Mobile Subscriber Identity (IMSI), first Service Provider Name (SPN), etc. corresponding to a first subscriber profile included in the MUSIM). The method then proceeds to 804.

At 804, the UE device connects to a second 3GPP access network operated by the first MNO or a second MNO. For example, the UE device 102 shown in FIG. 1 connects to the 3GPP access network 104-2 that is operated by a second MNO (e.g., AT&T) using information included in the MUSIM (e.g., second authentication key, second International Mobile Subscriber Identity (IMSI), second Service Provider Name (SPN), etc. corresponding to a second subscriber profile included in the MUSIM). The method then proceeds to 806.

At 806, the UE device stores a plurality of Access Traffic Steering, Switching & Splitting (ATSSS) rules including information a first network indicator corresponding to first 3GPP access network operated by the first MNO (e.g., 3GPP-1), and a second network indicator corresponding to the second 3GPP access network operated by the first MNO or the second MNO (e.g., 3GPP-2). For example, the UE device 102 shown in FIG. 1 receives the ATSSS rules from the Session Management Function (SMF) device 112-1 via the Access and Mobility Management Function (AMF) device 106-1 and stores the ATSSS rules in the memory 604. In one or more implementations, the memory 604 is preconfigured with the ATSSS rules. The method then proceeds to 808.

At 808, the UE device processes the ATSSS rules received at 806. For example, the UE device 102 shown in FIG. 1 uses rule precedence information associated with each ATSSS rule to determine an order in which the ATSSS rules are evaluated, and then evaluates the rules. The method then proceeds to 810.

By way of example, if an ATSSS rule is "Traffic Descriptor: UDP, DestAddr Address-1", "Steering Mode: Active-Standby, Active=3GPP-1, Standby=3GPP-2", the UE device 102 determines that UDP traffic with destination IP address Address-1 is to be steered to the active access (3GPP-1), if available; if the active access is not available, the UE device 102 determines that UDP traffic with destination IP address Address-1 is to be steered to the standby access (3GPP-1). In one or more implementations, 3GPP-1 is a first PLMN corresponding to the 3GPP access network to which the UE device 102 connected to at 802, and 3GPP-2 is a second PLMN corresponding to the 3GPP access network to which the UE device 102 connected to at 804.

By way of another example, if an ATSSS rule is "Traffic Descriptor: TCP, DestPort Port-1", "Steering Mode: Smallest Delay", the UE device 102 determines that TCP traffic with destination port Port-1 is to be steered to the access with the smallest delay, which requires the UE device 102 to determine a first Round-Trip Time (RTT) corresponding to the 3GPP access network (e.g., 3GPP access network 104-1) that is operated by the first MNO, determine a second RTT corresponding to a 3GPP access network (e.g., 3GPP access network 104-2) that is operated by the second MNO, in order to determine which 3GPP access network has the smallest delay. In one or more embodiments the UE device 102 determines the first RTT by pinging a server via the 3GPP access network 104-1 using the Internet Control Message Protocol (ICMP), and the UE device 102 determines the second RTT by pinging the server via the 3GPP access network 104-2 using the ICMP. Other methods of determining RTT may be used without departing from the scope of the present disclosure.

By way of yet another example, if an ATSSS rule is "Traffic Descriptor: Application-1", "Steering Mode: Load-Balancing, 3GPP-1=30%, 3GPP-2=70%", "Steering Functionality: MPTCP", the UE device 102 determines that 30% of the traffic of Application-1 is to be sent to the 3GPP access network 104-1 that is operated by the first MNO, and 70% of the traffic of Application-1 is to be sent to the 3GPP access network 104-2 that is operated by the second MNO by using MPTCP functionality. If the ATSSS rule were to include "MPQUIC" instead of "MPTCP", the UE device 102 would determine to transmit the traffic of Application-1 by using MPQUIC functionality. In one or more implementations, 3GPP-1 is a first PLMN corresponding to the 3GPP access network to which the UE device 102 connected to at 802, and 3GPP-2 is a second PLMN corresponding to the 3GPP access network to which the UE device 102 connected to at 804.

At 810, the UE device transmits first traffic to the first 3GPP access network operated by the first MNO based on the processing performed at 808. For example, the UE device 102 shown in FIG. 1 transmits first traffic to the 3GPP access network 104-1 that is operated by the first MNO. The method 800 then proceeds to 812.

At 812, the UE device transmit second traffic to the second 3GPP access network operated by the first MNO or the second MNO based on the processing performed at 808. For example, the UE device 102 shown in FIG. 1 transmits second traffic to the 3GPP access network 104-2 that is operated by the second MNO. The method 800 then ends.

Figure 9:
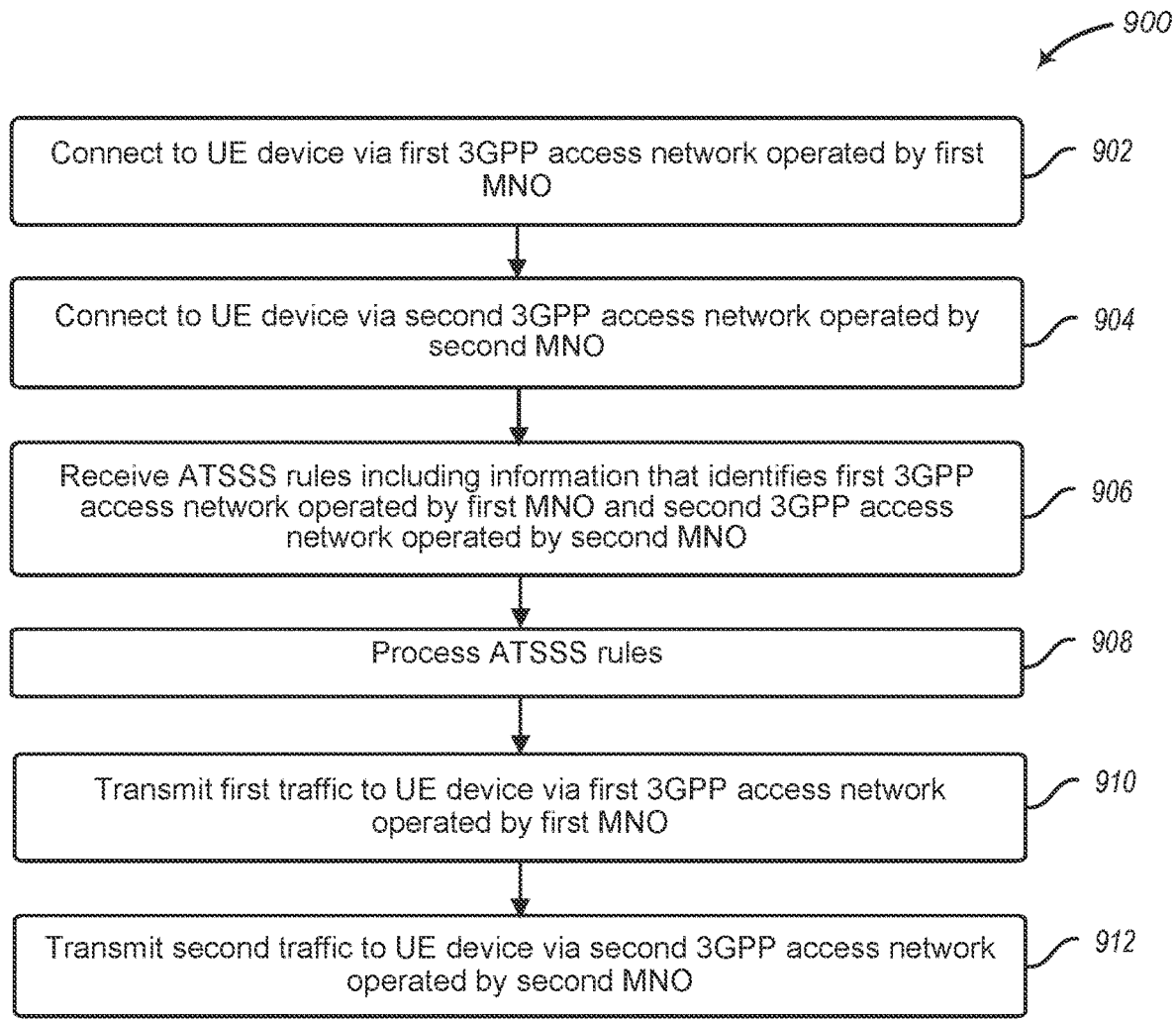
FIG. 9 illustrates a logical flow diagram showing an example of a method of operating a UPF device in accordance with embodiments described herein.

FIG. 9 illustrates a logical flow diagram showing an example of a method 900 of operating a UPF device in accordance with embodiments described herein. The method 900 begins at 902.

At 902, a User Plane Function (UPF) device connects to a User Equipment (UE) device via a first 3GPP access network operated by a first MNO. For example, the UPF device 116-1 operated by the first mobile network operator shown in FIG. 1 connects to the UE device 102 via the 3GPP access network 104-1 that is operated by a first MNO (e.g., DISH Network) in response to a request from the UE device 102. The method then proceeds to 904.

At 904, the UPF device connects to the UE device via a second 3GPP access network operated by the first MNO or a second MNO. For example, the UPF device 116-1 operated by the first mobile network operator shown in FIG. 1 connects to the UE device 102 via the 3GPP access network 104-2 that is operated by a second MNO (e.g., AT&T) in response to a request from the UE device 102. The method then proceeds to 906.

At 906, the UPF device receives a plurality of Access Traffic Steering, Switching & Splitting (ATSSS) rules including information that identifies a first 3GPP access network operated by a first MNO and a second 3GPP access network operated by the first MNO or a second MNO. For example, the UPF device 116-1 operated by the first mobile network operator shown in FIG. 1 receives the ATSSS rules from the Session Management Function (SMF) device 112-1. In one or more implementations, the information that identifies the first 3GPP access network is a first PLMN corresponding to the 3GPP access network to which the UE device 102 connected to at 802, and the information that identifies the first 3GPP access network is a second PLMN corresponding to the 3GPP access network to which the UE device 102 connected to at 804. The method then proceeds to 908.

At 908, the UPF device processes the ATSSS rules received at 906. For example, the UPF device 116-1 operated by the first mobile network operator shown in FIG. 1 processes the ATSSS rules in a manner that is similar to the processing described in connection with 808 of the method 800 shown in FIG. 8. The method then proceeds to 910.

At 910, the UPF device transmits first traffic to the UE device via the first 3GPP access network operated by the first MNO based on the processing performed at 908. For example, the UPF device 116-1 operated by the first mobile network operator shown in FIG. 1 transmits first traffic to the UE device 102 via the 3GPP access network 104-1 that is operated by the first MNO. The method 900 then proceeds to 912.

At 912, the UPF device transmit second traffic to the UE device via the second 3GPP access network operated by the first MNO or the second MNO based on the processing performed at 908. For example, the PF device 116-1 shown in FIG. 1 transmits the second traffic to the UE device via the 3GPP access network 104-2 that is operated by the second MNO. The method 900 then ends.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of routing traffic between a fifth-generation (5G) New Radio (NR) cellular telecommunication radio access network (RAN) and a 5G Core Network, the method comprising;

during a first time period when a user equipment (UE) device is located in a first coverage area and a second coverage area:

connecting, by the UE device, to a first Third-Generation Partnership Project (3GPP) access network for the first coverage area and connecting to a second 3GPP access network for the second coverage area;

receiving, by the UE device, at least a first Access Traffic Steering, Switching and Splitting (ATSSS) rule from the first 3GPP access network, wherein the first ATSSS rule includes first traffic descriptor information corresponding to a first type of traffic and first steering mode information including a first network indicator corresponding to the first 3GPP access network operated by a first Mobile Network Operator (MNO);

receiving, by the UE device, at least a second ATSSS rule from the second 3GPP access network, wherein the second ATSSS rule includes second traffic descriptor information corresponding to the first type of traffic or a second type of traffic and second steering mode information including a second network indicator corresponding to the second 3GPP access network operated by the first MNO or a second MNO;

storing, by the UE device, the first ATSSS rule and the second ATSSS rule;
transmitting, by the UE device, the first type of traffic corresponding to the first traffic descriptor information included in the first ATSSS rule to the first 3GPP access network operated by the first MNO; and
transmitting, by the UE device, the first type of traffic or the second type of traffic corresponding to the second traffic descriptor information included in the second ATSSS rule to the second 3GPP access network operated by the first MNO or the second MNO; and during a second time period after the first time when the UE device is located in the first coverage area and a third coverage area:
performing, by the UE device, a handover from the second 3GPP access network to a third 3GPP access network for the third coverage area, including:
connecting, by the UE device, to the third 3GPP access network;
receiving, by the UE device, at least a third ATSSS rule from the third 3GPP access network, wherein the third ATSSS rule includes third traffic descriptor information corresponding to the first type of traffic or the second type of traffic and third steering mode information including a third network indicator corresponding to the third 3GPP access network; and
storing, by the UE device, the third ATSSS rule;
transmitting, by the UE device, the first type of traffic corresponding to the first traffic descriptor information included in the first ATSSS rule to the first 3GPP access network operated by the first MNO; and
transmitting, by the UE device, the first type of traffic or the second type of traffic corresponding to the third traffic descriptor information included in the third ATSSS rule to the third 3GPP access network operated.

2. The method according to claim 1, wherein:
the transmitting the first type of traffic corresponding to the first traffic descriptor information included in the first ATSSS rule to the first 3GPP access network operated by the first MNO is performed using a Multipoint Transmission Control Protocol (MPTCP), and
the transmitting the first type of traffic or the second type of traffic corresponding to the second traffic descriptor information included in the second ATSSS rule to the second 3GPP access network operated by the first MNO or the second MNO is performed using the MPTCP.

3. The method according to claim 1, wherein:
the transmitting the first type of traffic corresponding to the first traffic descriptor information included in the first ATSSS rule to the first 3GPP access network operated by the first MNO is performed using a Multipath Quick User Datagram Protocol (UPD) Internet Connection (MPQUIC) protocol, and
the transmitting the first type of traffic or the second type of traffic corresponding to the second traffic descriptor information included in the second ATSSS rule to the second 3GPP access network operated by the first MNO or the second MNO is performed using the MPQUIC protocol.

4. The method according to claim 1, wherein:
the second steering mode information included in the second ATSSS rule includes the first network indicator corresponding to the first 3GPP access network operated by the first MNO and the second network indicator corresponding to the second 3GPP access network operated by the first MNO or the second MNO, and
the method further comprises:
before or after the transmitting the first type of traffic or the second type of traffic corresponding to the second traffic descriptor information included in the second ATSSS rule to the second 3GPP access network operated by the first MNO or the second MNO, transmitting, by the UE device, the first type of traffic or the second type of traffic corresponding to the second traffic descriptor information included in the second ATSSS rule to the first 3GPP access network operated by the first MNO.

5. The method according to claim 4, wherein:
the second steering mode information included in the second ATSSS rule indicates that the first 3GPP access network operated by the first MNO is a standby network, and
the second steering mode information included in the second ATSSS rule indicates that the second 3GPP access network operated by the first MNO or the second MNO is an active network.

6. The method according to claim 1, wherein during the first time period:
receiving, by the UE device, at least a fourth ATSSS rule, wherein the fourth ATSSS rule includes fourth traffic descriptor information corresponding to a fourth type of traffic and steering mode information indicating smallest delay;
determining a first Round-Trip Time (RTT) corresponding to the first 3GPP access network operated by the first MNO;
determining a second RTT corresponding to the second 3GPP access network operated by the first MNO or the second MNO;
if the first RTT is greater than the second RTT, transmitting, by the UE device, the fourth type of traffic corresponding to the fourth traffic descriptor information included in the fourth ATSSS rule to the second 3GPP access network operated by the first MNO or the second MNO; and
if the first RTT is less than the second RTT, transmitting, by the UE device, the fourth type of traffic corresponding to the fourth traffic descriptor information included in the fourth ATSSS rule to the first 3GPP access network operated by the first MNO.

7. The method according to claim 1, wherein during the first time period:
receiving, by the UE device, at least a third a fourth ATSSS rule, wherein the fourth ATSSS rule includes fourth traffic descriptor information corresponding to an application and steering mode information indicating a first percentage corresponding to the first 3GPP access network operated by the first MNO and a second percentage corresponding to the second 3GPP access network operated by the first MNO or the second MNO;
transmitting, by the UE device, first traffic corresponding to the application to the first 3GPP access network operated by the first MNO based on the first percentage corresponding to the first 3GPP access network operated by the first MNO; and
transmitting, by the UE device, second traffic corresponding to the application to the second 3GPP access network operated by the first MNO or the second MNO based on the second percentage corresponding to the second 3GPP access network operated by the first MNO or the second MNO.

8. A method of routing traffic between a fifth-generation (5G) New Radio (NR) cellular telecommunication radio access network (RAN) and a 5G Core Network, the method comprising;
during a first time period when a user equipment (UE) device is located in a first coverage area and a second coverage area;
receiving, by a User Plane Function (UPF) device, a plurality of Access Traffic Steering, Switching and Splitting (ATSSS) rules, including at least a first ATSSS rule and a second ATSSS rule,
wherein the first ATSSS rule includes first traffic descriptor information corresponding to a first type of traffic and first steering mode information including a first network indicator corresponding to a first Third-Generation Partnership Project (3GPP) access network operated by a first Mobile Network Operator (MNO), and
wherein the second ATSSS rule includes second traffic descriptor information corresponding to the first type of traffic or a second type of traffic and second steering mode information including a second network indicator corresponding to a second 3GPP access network operated by the first MNO or a second MNO;
transmitting, by the UPF device, the first type of traffic corresponding to the first traffic descriptor information included in the first ATSSS rule to a User Equipment (UE) device via the first 3GPP access network operated by the first MNO; and
transmitting, by the UPF device, the first type of traffic or the second type of traffic corresponding to the second traffic descriptor information included in second ATSSS rule to the UE device via the second 3GPP access network operated by the first MNO or the second MNO; and
during a second time period after the first time when the UE device is located in the first coverage area and a third coverage area:
receiving, by the UPF device, at least a third ATSSS rule from the third 3GPP access network, wherein the third ATSSS rule includes third traffic descriptor information corresponding to the first type of traffic or the second type of traffic and third steering mode information including a third network indicator corresponding to the third 3GPP access network; and
transmitting, by the UPF device, the first type of traffic corresponding to the first traffic descriptor information included in the first ATSSS rule to the UE device via the first 3GPP access network operated by the first MNO; and
transmitting, by the UPF device, the first type of traffic or the second type of traffic corresponding to the third traffic descriptor information included in the third ATSSS rule to the UE device via the third 3GPP access network.

9. The method according to claim 8, wherein:
the transmitting the first type of traffic corresponding to the first traffic descriptor information included in the first ATSSS rule to the UE device via the first 3GPP access network operated by the first MNO is performed using a Multipoint Transmission Control Protocol (MPTCP), and
the transmitting the first type of traffic or the second type of traffic corresponding to the second traffic descriptor information included in the second ATSSS rule to the UE device via the second 3GPP access network operated by the first MNO or the second MNO is performed using the MPTCP.

10. The method according to claim 8, wherein:
the transmitting the first type of traffic corresponding to the first traffic descriptor information included in the first ATSSS rule to the first 3GPP access network operated by the first MNO is performed using a Multipath Quick User Datagram Protocol (UPD) Internet Connection (MPQUIC) protocol, and
the transmitting the first type of traffic or the second type of traffic corresponding to the second traffic descriptor information included in the second ATSSS rule to the second 3GPP access network operated by the first MNO or the second MNO is performed using the MPQUIC protocol.

11. The method according to claim 8, wherein:
the second steering mode information included in the second ATSSS rule includes the first network indicator corresponding to the first 3GPP access network operated by the first MNO and the second network indicator corresponding to the second 3GPP access network operated by the first MNO or the second MNO, and
the method further comprises:
before or after the transmitting the first type of traffic or the second type of traffic corresponding to the second traffic descriptor information included in the second ATSSS rule to the second 3GPP access network operated by the first MNO or the second MNO, transmitting, by the UPF device, the first type of traffic or the second type of traffic corresponding to the second traffic descriptor information included in the second ATSSS rule to the UE device via the first 3GPP access network operated by the first MNO.

12. The method according to claim 11, wherein:
the second steering mode information included in the second ATSSS rule indicates that the first 3GPP access network operated by the first MNO is a standby network, and
the second steering mode information included in the second ATSSS rule indicates that the second 3GPP access network operated by the first MNO or the second MNO is an active network.

13. The method according to claim 8, wherein during the first time period:
receiving, by the UPF device, a fourth ATSSS rule, wherein the fourth ATSSS rule includes fourth traffic descriptor information corresponding to a fourth type of traffic and steering mode information indicating smallest delay;
determining a first Round-Trip Time (RTT) corresponding to the first 3GPP access network operated by the first MNO;
determining a second RTT corresponding to the second 3GPP access network operated by the first MNO or the second MNO;
if the first RTT is greater than the second RTT, transmitting, by the UPF device, the fourth type of traffic corresponding to the fourth traffic descriptor information included in the fourth ATSSS rule to the UE device via the second 3GPP access network operated by the first MNO or the second MNO; and
if the first RTT is less than the second RTT, transmitting, by the UPF device, the fourth type of traffic corresponding to the fourth traffic descriptor information included in the fourth ATSSS rule to the UE device via the first 3GPP access network operated by the first MNO.

14. The method according to claim 8, wherein during the first time period:
receiving, by the UPF device, a fourth ATSSS rule, wherein the fourth ATSSS rule includes a fourth traffic descriptor information corresponding to an application and steering mode information indicating a first percentage corresponding to the first 3GPP access network operated by the first MNO and a second percentage corresponding to the second 3GPP access network operated by the first MNO or the second MNO;
transmitting, by the UPF device, first traffic corresponding to the application to the UE device via the first 3GPP access network operated by the first MNO based on the first percentage corresponding to the first 3GPP access network operated by the first MNO; and
transmitting, by the UPF device, second traffic corresponding to the application to the UE device via the second 3GPP access network operated by the first MNO or the second MNO based on the second percentage corresponding to the second 3GPP access network operated by the first MNO or the second MNO.

15. A User Equipment (UE) device, comprising;
at least one memory that stores computer executable instructions; and
at least one processor that executes the computer executable instructions to cause actions to be performed, the actions including:
during a first time period when a user equipment (UE) device is located in a first coverage area and a second coverage area:
connect to a first Third-Generation Partnership Project (3GPP) access network for the first coverage area and connecting to a second 3GPP access network for the second coverage area;
receive a plurality of Access Traffic Steering, Switching and Splitting (ATSSS) rules, including at least a first ATSSS rule and a second ATSSS rule,
wherein the first ATSSS rule includes first traffic descriptor information corresponding to a first type of traffic and first steering mode information including a first network indicator corresponding to a first Third-Generation Partnership Project (3GPP) access network operated by a first Mobile Network Operator (MNO), and
wherein the second ATSSS rule includes second traffic descriptor information corresponding to the first type of traffic or a second type of traffic and second steering mode information including a second network indicator corresponding to a second 3GPP access network operated by the first MNO or a second MNO;
transmit the first type of traffic corresponding to the first traffic descriptor information included in the first ATSSS rule to the first 3GPP access network operated by the first MNO; and
transmit the first type of traffic or the second type of traffic corresponding to the second traffic descriptor information included in the second ATSSS rule to the second 3GPP access network operated by the first MNO or the second MNO; and
during a second time period after the first time when the UE device is located in the first coverage area and a third coverage area:
perform a handover from the second 3GPP access network to a third 3GPP access network for the third coverage area, including:
connect to the third 3GPP access network; and
receive at least a third ATSSS rule from the third 3GPP access network, wherein the third ATSSS rule includes third traffic descriptor information corresponding to the first type of traffic or the second type of traffic and third steering mode information including a third network indicator corresponding to the third 3GPP access network;
transmit the first type of traffic corresponding to the first traffic descriptor information included in the first ATSSS rule to the first 3GPP access network operated by the first MNO; and
transmit the first type of traffic or the second type of traffic corresponding to the third traffic descriptor information included in the third ATSSS rule to the third 3GPP access network.

16. The UE device according to claim 15, wherein during the first time period the actions further include:
transmit the first type of traffic corresponding to the first traffic descriptor information included in the first ATSSS rule to the first 3GPP access network operated by the first MNO using a Multipoint Transmission Control Protocol (MPTCP); and
transmit the first type of traffic or the second type of traffic corresponding to the second traffic descriptor information included in the second ATSSS rule to the second 3GPP access network operated by the first MNO or the second MNO using the MPTCP.

17. The UE device according to claim 15, wherein during the first time period the actions further include:
transmit the first type of traffic corresponding to the first traffic descriptor information included in the first ATSSS rule to the first 3GPP access network operated by the first MNO using a Multipath Quick User Datagram Protocol (UPD) Internet Connection (MPQUIC) protocol; and
transmit the first type of traffic or the second type of traffic corresponding to the second traffic descriptor information included in the second ATSSS rule to the second 3GPP access network operated by the first MNO or the second MNO using the MPQUIC protocol.

18. The UE device according to claim 15, wherein:
the second steering mode information included in the second ATSSS rule includes the first network indicator corresponding to the first 3GPP access network operated by the first MNO and the second network indicator corresponding to the second 3GPP access network operated by the first MNO or the second MNO, and
the actions further include:
before or after the first type of traffic or the second type of traffic corresponding to the second traffic descriptor information included in the second ATSSS rule is transmitted to the second 3GPP access network operated by the first MNO or the second MNO, transmit the first type of traffic or the second type of traffic corresponding to the second traffic descriptor information included in the second ATSSS rule to the first 3GPP access network operated by the first MNO.

19. The UE device according to claim 15, wherein during the first time period the actions further include:
receive a fourth ATSSS rule, wherein the fourth ATSSS rule includes fourth third traffic descriptor information corresponding to a fourth type of traffic and steering mode information indicating smallest delay;

determine a first Round-Trip Time (RTT) corresponding to the first 3GPP access network operated by the first MNO;

determine a second RTT corresponding to the second 3GPP access network operated by the first MNO or the second MNO;

if the first RTT is greater than the second RTT, transmit the fourth type of traffic corresponding to the fourth traffic descriptor information included in the fourth ATSSS rule to the second 3GPP access network operated by the first MNO or the second MNO; and if the first RTT is less than the second RTT, transmit the fourth type of traffic corresponding to the fourth traffic descriptor information included in the fourth ATSSS rule to the first 3GPP access network operated by the first MNO.

20. The UE device according to claim 15, wherein during the first time period the actions further include:

receive a fourth ATSSS rule, wherein the fourth ATSSS rule includes fourth traffic descriptor information corresponding to an application and steering mode information indicating a first percentage corresponding to the first 3GPP access network operated by the first MNO and a second percentage corresponding to the second 3GPP access network operated by the first MNO or the second MNO;

transmit first traffic corresponding to the application to the first 3GPP access network operated by the first MNO based on the first percentage corresponding to the first 3GPP access network operated by the first MNO; and transmit second traffic corresponding to the application to the second 3GPP access network operated by the first MNO or the second MNO based on the second percentage corresponding to the second 3GPP access network operated by the first MNO or the second MNO.

* * * * *

UNITED STATES PATENT AND TRADEMARK OFFICE
CERTIFICATE OF CORRECTION

PATENT NO. : 12,382,363 B2
APPLICATION NO. : 17/887210
DATED : August 5, 2025
INVENTOR(S) : Mehdi Alasti et al.

Page 1 of 1

It is certified that error appears in the above-identified patent and that said Letters Patent is hereby corrected as shown below:

In the Claims

<u>Column 20, Claim 7, Line 50:</u>
"at least a third a fourth" should read: --at least a fourth--.

<u>Column 24, Claim 19, Line 67:</u>
"fourth third traffic" should read: --fourth traffic--.

Signed and Sealed this
Fourteenth Day of October, 2025

John A. Squires
*Director of the United States Patent and Trademark Office*